(12) United States Patent
Sodagar

(10) Patent No.: US 11,303,688 B2
(45) Date of Patent: Apr. 12, 2022

(54) METHODS AND APPARATUSES FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/031,227

(22) Filed: Sep. 24, 2020

(65) Prior Publication Data

US 2021/0099506 A1   Apr. 1, 2021

Related U.S. Application Data

(60) Provisional application No. 62/908,238, filed on Sep. 30, 2019.

(51) Int. Cl.
| | |
|---|---|
| *H04L 29/06* | (2006.01) |
| *H04L 29/08* | (2006.01) |
| *H04L 65/60* | (2022.01) |
| *H04L 67/02* | (2022.01) |
| *H04L 65/65* | (2022.01) |

(52) U.S. Cl.
CPC .......... *H04L 65/601* (2013.01); *H04L 65/608* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2018/0288125 | A1* | 10/2018 | Thang | H04L 65/602 |
| 2019/0020915 | A1* | 1/2019 | Stockhammer | H04L 65/607 |
| 2019/0149857 | A1* | 5/2019 | Lo | H04N 21/43074 |
| | | | | 709/219 |
| 2019/0243881 | A1* | 8/2019 | Zia | G06F 40/143 |
| 2019/0281100 | A1 | 9/2019 | Lo et al. | |
| 2019/0373213 | A1* | 12/2019 | Hamada | H04N 21/2343 |
| 2020/0045323 | A1* | 2/2020 | Hannuksela | H04N 21/8543 |

(Continued)

OTHER PUBLICATIONS

International Search Report dated Jan. 28, 2021 in International Application No. PCT/US2020/53031, (15 pages).

(Continued)

*Primary Examiner* — Joshua Joo
(74) *Attorney, Agent, or Firm* — Arentfox Schiff LLP

(57) ABSTRACT

Aspects of the disclosure provide methods, apparatuses, and non-transitory computer-readable storage mediums for receiving media data. One apparatus includes processing circuitry that receives a timed metadata track of a plurality of segments including a plurality of metadata samples. Each of the plurality of segments includes only one of the plurality of metadata samples. Each of the plurality of metadata samples includes one or more event message boxes. Fragmentation and defragmentation processes are performed on the timed metadata track. The processing circuitry determines a start time and an active duration of each event message box. The processing circuitry processes event information included in each event message box based on the start time and the active duration of the respective event message box.

20 Claims, 6 Drawing Sheets

(56) References Cited

U.S. PATENT DOCUMENTS

| | | | | |
|---|---|---|---|---|
| 2020/0260158 | A1* | 8/2020 | Lee | H04N 21/8166 |
| 2021/0211782 | A1* | 7/2021 | Mekuria | H04L 65/607 |
| 2021/0306698 | A1* | 9/2021 | Toma | H04N 21/233 |
| 2021/0344986 | A1* | 11/2021 | Yang | H04N 21/8586 |

OTHER PUBLICATIONS

Information technology—Coding of audio-visual objects—Part 12: ISO base media file format, Dec. 15, 2015 (248 pages).
Information technology—Dynamic adaptive streaming over HTTP (DASH)—Part 1: Media presentation description and segment formats, N18609, Aug. 12, 2019 (287 pages).
Appendix A of Information technology—Dynamic adaptive streaming over HTTP (DASH)—Part 1: Media presentation description and segment formats, N18609, Aug. 12, 2019, DASH-MPD (21 pages).
Appendix B of Information technology—Dynamic adaptive streaming over HTTP (DASH)—Part 1: Media presentation description and segment formats, N18609, Aug. 12, 2019, DASH-MPD-UP (2 pages).
Appendix C of Information technology—Dynamic adaptive streaming over HTTP (DASH)—Part 1: Media presentation description and segment formats, N18609, Aug. 12, 2019, example_G1 (3 pages).
Appendix D of Information technology—Dynamic adaptive streaming over HTTP (DASH)—Part 1: Media presentation description and segment formats, N18609, Aug. 12, 2019, example_G2 (3 pages).
Appendix E of Information technology—Dynamic adaptive streaming over HTTP (DASH)—Part 1: Media presentation description and segment formats, N18609, Aug. 12, 2019, example_G3 (3 pages).
Appendix F of Information technology—Dynamic adaptive streaming over HTTP (DASH)—Part 1: Media presentation description and segment formats, N18609, Aug. 12, 2019, example_G4 (4 pages).
Appendix G of Information technology—Dynamic adaptive streaming over HTTP (DASH)—Part 1: Media presentation description and segment formats, N18609, Aug. 12, 2019, example_G5 (3 pages).
Appendix H of Information technology—Dynamic adaptive streaming over HTTP (DASH)—Part 1: Media presentation description and segment formats, N18609, Aug. 12, 2019, example_G6 (2 pages).
Appendix I of Information technology—Dynamic adaptive streaming over HTTP (DASH)—Part 1: Media presentation description and segment formats, N18609, Aug. 12, 2019, example_G7 (3 pages).
Appendix J of Information technology—Dynamic adaptive streaming over HTTP (DASH)—Part 1: Media presentation description and segment formats, N18609, Aug. 12, 2019, example_G8 (3 pages).
Appendix K of Information technology—Dynamic adaptive streaming over HTTP (DASH)—Part 1: Media presentation description and segment formats, N18609, Aug. 12, 2019, example_G9 (3 pages).
Appendix L of Information technology—Dynamic adaptive streaming over HTTP (DASH)—Part 1: Media presentation description and segment formats, N18609, Aug. 12, 2019, example_G10 (3 pages).
Appendix M of Information technology—Dynamic adaptive streaming over HTTP (DASH)—Part 1: Media presentation description and segment formats, N18609, Aug. 12, 2019, example_G11 (3 pages).
Appendix N of Information technology—Dynamic adaptive streaming over HTTP (DASH)—Part 1: Media presentation description and segment formats, N18609, Aug. 12, 2019, example_G11_remote. period (2 pages).
Appendix O of Information technology—Dynamic adaptive streaming over HTTP (DASH)—Part 1: Media presentation description and segment formats, N18609, Aug. 12, 2019, example_G12 (3 pages).
Appendix P of Information technology—Dynamic adaptive streaming over HTTP (DASH)—Part 1: Media presentation description and segment formats, N18609, Aug. 12, 2019, example_G13-1 (2 pages).
Appendix Q of Information technology—Dynamic adaptive streaming over HTTP (DASH)—Part 1: Media presentation description and segment formats, N18609, Aug. 12, 2019, example_G13-2 (2 pages).
Appendix R of Information technology—Dynamic adaptive streaming over HTTP (DASH)—Part 1: Media presentation description and segment formats, N18609, Aug. 12, 2019, example_G14 (2 pages).
Appendix S of Information technology—Dynamic adaptive streaming over HTTP (DASH)—Part 1: Media presentation description and segment formats, N18609, Aug. 12, 2019, example_G15 (3 pages).
Appendix T of Information technology—Dynamic adaptive streaming over HTTP (DASH)—Part 1: Media presentation description and segment formats, N18609, Aug. 12, 2019, example_G16 (3 pages).
Appendix U of Information technology—Dynamic adaptive streaming over HTTP (DASH)—Part 1: Media presentation description and segment formats, N18609, Aug. 12, 2019, example_G17 (3 pages).
Appendix V of Information technology—Dynamic adaptive streaming over HTTP (DASH)—Part 1: Media presentation description and segment formats, N18609, Aug. 12, 2019, example_G18 (3 pages).
Appendix W of Information technology—Dynamic adaptive streaming over HTTP (DASH)—Part 1: Media presentation description and segment formats, N18609, Aug. 12, 2019 example_H1 (2 pages).
Appendix X of Information technology—Dynamic adaptive streaming over HTTP (DASH)—Part 1: Media presentation description and segment formats, N18609, Aug. 12, 2019, example_H2 (3 pages).
Appendix Y of Information technology—Dynamic adaptive streaming over HTTP (DASH)—Part 1: Media presentation description and segment formats, N18609, Aug. 12, 2019, example_H3 (3 pages).
Appendix Z of Information technology—Dynamic adaptive streaming over HTTP (DASH)—Part 1: Media presentation description and segment formats, N18609, Aug. 12, 2019, example_I1 (2 pages).
Appendix AA of Information technology—Dynamic adaptive streaming over HTTP (DASH)—Part 1: Media presentation description and segment formats, N18609, Aug. 12, 2019, example_I2 (2 pages).
Appendix AB of Information technology—Dynamic adaptive streaming over HTTP (DASH)—Part 1: Media presentation description and segment formats, N18609, Aug. 12, 2019, example_I3 (2 pages).
Appendix AC of Information technology—Dynamic adaptive streaming over HTTP (DASH)—Part 1: Media presentation description and segment formats, N18609, Aug. 12, 2019, example_I4 (2 pages).
Appendix AD of Information technology—Dynamic adaptive streaming over HTTP (DASH)—Part 1: Media presentation description and segment formats, N18609, Aug. 12, 2019, License (2 pages).
Appendix AE of Information technology—Dynamic adaptive streaming over HTTP (DASH)—Part 1: Media presentation description and segment formats, N18609, Aug. 12, 2019, README.md (2 pages).
Appendix AF of Information technology—Dynamic adaptive streaming over HTTP (DASH)—Part 1: Media presentation description and segment formats, N18609, Aug. 12, 2019, Figure 4 (2 pages).
Appendix AG of Information technology—Dynamic adaptive streaming over HTTP (DASH)—Part 1: Media presentation description and segment formats, N18609, Aug. 12, 2019, Figure-1 (2 pages).

(56) References Cited

OTHER PUBLICATIONS

Appendix AH of Information technology—Dynamic adaptive streaming over HTTP (DASH)—Part 1: Media presentation description and segment formats, N18609, Aug. 12, 2019, Figure-2 (2 pages).
Appendix AI of Information technology—Dynamic adaptive streaming over HTTP (DASH)—Part 1: Media presentation description and segment formats, N18609, Aug. 12, 2019, Figure-3 (2 pages).
Appendix AJ of Information technology—Dynamic adaptive streaming over HTTP (DASH)—Part 1: Media presentation description and segment formats, N18609, Aug. 12, 2019, Figure-5 (2 pages).
Appendix AK of Information technology—Dynamic adaptive streaming over HTTP (DASH)—Part 1: Media presentation description and segment formats, N18609, Aug. 12, 2019, Figure-6 (2 pages).
Appendix AL of Information technology—Dynamic adaptive streaming over HTTP (DASH)—Part 1: Media presentation description and segment formats, N18609, Aug. 12, 2019, Figure-D.1 (2 pages).
Appendix AM of Information technology—Dynamic adaptive streaming over HTTP (DASH)—Part 1: Media presentation description and segment formats, N18609, Aug. 12, 2019, Figure-K.1 (2 pages).
Hughes et al., "Information technology—Coding of audio-visual objects—Part 19: Common media application format (CMAF) for segmented media," Hobart, Australia, May 30, 2017 (147 pages).
Appendix AN of Hughes et al., "Information technology—Coding of audio-visual objects—Part 19: Common media application format (CMAF) for segmented media," Hobart, Australia, May 30, 2017, w16819-23000, CMAF FDIS diagrams (33 pages).

\* cited by examiner

METHODS AND APPARATUSES FOR DYNAMIC ADAPTIVE STREAMING OVER HTTP

INCORPORATION BY REFERENCE

This present application claims the benefit of priority to U.S. Provisional Application No. 62/908,238, "SINGLE-SAMPLE SPARSE TIMED METADATA DASH SEGMENTS AND CMAF FRAGMENTS WITH EMBEDDED EVENT MESSAGE BOXES" filed on Sep. 30, 2019, which is incorporated by reference herein in its entirety.

TECHNICAL FIELD

The present disclosure describes embodiments generally related to methods and apparatuses for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. The DASH standard allows carrying event message boxes in media segments.

SUMMARY

Aspects of the disclosure provide apparatuses for receiving media data. One apparatus includes processing circuitry that receives a timed metadata track of a plurality of segments including a plurality of metadata samples. Each of the plurality of segments includes only one of the plurality of metadata samples. Each of the plurality of metadata samples includes one or more event message boxes. The processing circuitry determines a start time and an active duration of each event message box. The processing circuitry processes event information included in each event message box based on the start time and the active duration of the respective event message box. Fragmentation and defragmentation processes are performed on the timed metadata track.

In an embodiment, a timescale of each event message box is equal to a timescale of the timed metadata track.

In an embodiment, a presentation time and a duration of each of the plurality of metadata samples are equal to an earliest presentation time and a duration of one of the plurality of segments that includes the respective metadata sample.

In an embodiment, the presentation time of each of the plurality of metadata samples is an anchor for one of a presentation time value and a presentation time delta value of an event message box included in the respective metadata sample.

In an embodiment, a sum of the start time and the active duration of each event message box is limited by an end presentation time of the timed metadata track.

In an embodiment, each of the plurality of segments is one of a common media application format (CMAF) fragment and a dynamic adaptive streaming over hypertext transfer protocol (DASH) segment.

In an embodiment, each event message box included in one of the plurality of metadata samples includes a different scheme identifier.

In an embodiment, the fragmentation and defragmentation processes are based on the International Organization for Standardization (ISO)/International Electrotechnical Commission (IEC) base media file format (ISOBMFF) fragmentation and defragmentation processes.

Aspects of the disclosure provide methods for receiving media data. In one method, a timed metadata track of a plurality of segments including a plurality of metadata samples is received. Each of the plurality of segments includes only one of the plurality of metadata samples. Each of the plurality of metadata samples includes one or more event message boxes. A start time and an active duration of each event message box are determined. Event information included in each event message box is processed based on the start time and the active duration of the respective event message box. Fragmentation and defragmentation processes are performed on the timed metadata track.

Aspects of the disclosure also provide non-transitory computer-readable mediums storing instructions which when executed by a computer for receiving media data cause the computer to perform any one or a combination of the methods for receiving the media data.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
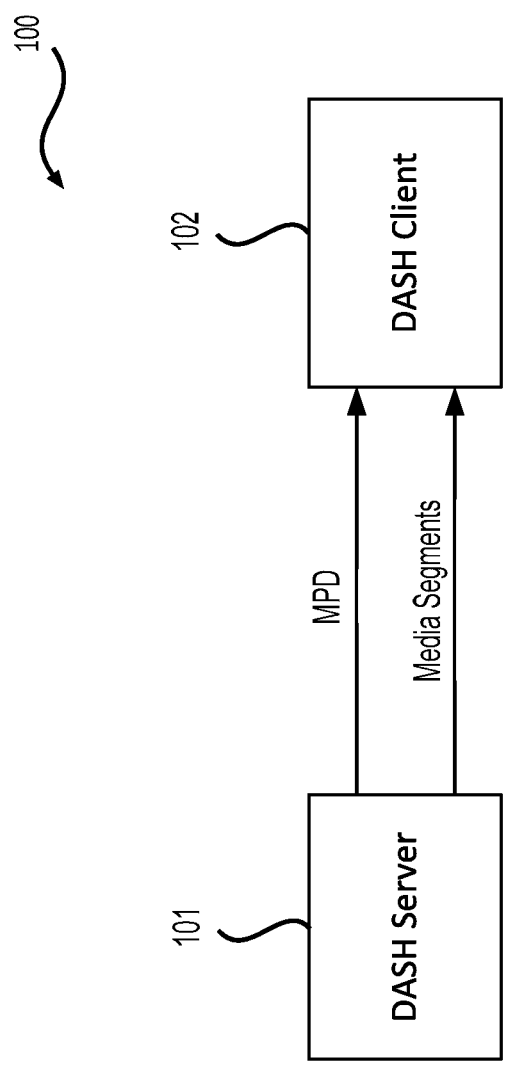
FIG. 1 shows an exemplary dynamic adaptive streaming over hypertext transfer protocol (DASH) system according to an embodiment of the disclosure.

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any of the adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Event Message Boxes

The International Organization for Standardization (ISO)/International Electrotechnical Commission (IEC) 23009-1 DASH standard introduced event message boxes for carrying events with media segments. ISO/IEC 23000-19 common media application format (CMAF) allows the event message boxes to be included at the beginning of each CMAF chunk. Carriage of event messages as part of the CMAF sparse metadata track has been discussed. However, a question arises regarding whether such tracks satisfy the fragmentation/defragmentation requirements of ISO/IEC 14496-12 ISO/IEC base media file format (ISOBMFF) tracks.

The present disclosure includes embodiments directed to signaling and processing of event information, such as event information included in timed metadata tracks. The event information can correspond to media timed events associated with points in time or periods of time in a media presentation (e.g., a continuous audio and/or video presentation). For example, the event information can be used for dynamic content replacement, ad insertion, presentation of supplemental content alongside audio and/or video, making changes to a web page, and executing application code triggered at specific points on a media timeline of the media presentation (e.g., an audio and/or video media stream). Further, the event information can be provided by different methods.

The media timed events can be used to carry information intended to be synchronized with a media stream. For example, the event information can include metadata (or timed metadata) that describes content of the media presentation, such as program or chapter titles, or geolocation information. Further, the event information can include control messages for a media player that are associated with specific times during playback of the media presentation, such as advertisement insertion cues.

Embodiments of the present disclosure can be implemented in MPEG-DASH. The timed metadata tracks can include embedded event message boxes (emsg) carrying event information. The timed metadata tracks can be used to carry similar information as the MPD events and inband events described above. The event information can include metadata that is time-synchronized with information provided in other tracks. Due to such synchronization, the metadata in the timed metadata tracks may be provided irregularly or non-continuously, and such time metadata tracks can be referred to as sparse timed metadata tracks.

When the timed metadata track carries event message boxes as part of metadata samples, each event message box can include its own timing which uses an earliest presentation time of a common media application format (CMAF) chunk or track including the event message box as an anchor. However, the ISO/IEC base media file format (ISOBMFF) requires that the timing of data is preserved if an ISOBMFF track goes through any fragmentation and defragmentation processes. The sparse timed metadata track carrying embedded events may not be able to support this requirement due to a loss of chunk or track boundaries in the fragmentation and defragmentation processes.

This disclosure presents methods for the sparse timed metadata track carrying embedded events to support any arbitrary fragmentation and defragmentation processes and therefore become a valid ISOBMFF track.

FIG. 1 shows an exemplary DASH system (100) according to an embodiment of the disclosure. In the DASH system (100), an MPD file is sent from a DASH server (101) (e.g., a content server) to a DASH client (102). The DASH client (102) can receive media segments from the DASH server (101) based on the MPD file. The DASH client (102) can send a request to the DASH server (101) for updating the MPD file. The DASH server (101) can provide a content stream, including primary content (e.g., a main program) and one or more timed metadata tracks.

Figure 2:
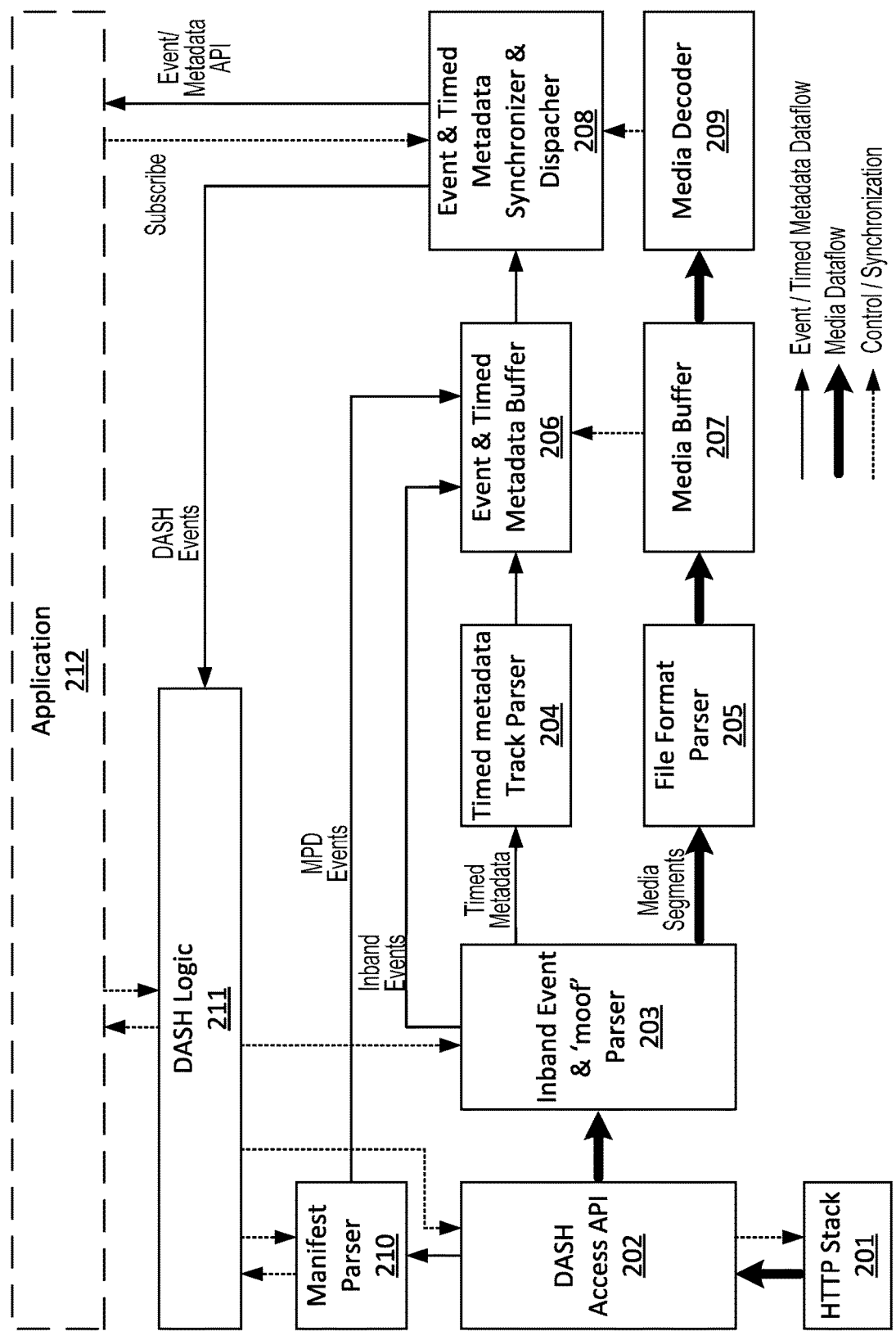
FIG. 2 shows an exemplary DASH client architecture according to an embodiment of the disclosure.

FIG. 2 shows an exemplary DASH client architecture according to an embodiment of the disclosure. The DASH client (or DASH player) can be configured to communicate with an application (212) and process various types of events, including (i) MPD events, (ii) inband events, and (iii) timed metadata events.

A manifest parser (210) can parse a manifest (e.g., an MPD). The manifest can be provided by the DASH server (101) for example. The manifest parser (210) can extract event information about MPD events, inband events, and timed metadata events embedded in timed metadata tracks. The extracted event information can be provided to a DASH logic (211) (e.g., DASH player control, selection, and heuristic logic). The DASH logic (211) can notify the application (212) of event schemes signaled in the manifest based on the event information.

The event information can include event scheme information for distinguishing between different event streams. The application (212) can use the event scheme information to subscribe to event schemes of interest. The application (212) can further indicate a desired dispatch mode for each of the subscribed schemes through one or more subscription application programming interfaces (APIs). For example, the application (212) can send a subscription request to the DASH client that identifies one or more event schemes of interest and any desired corresponding dispatch modes.

If the application (212) subscribes to one or more event schemes that are delivered as part of one or more timed metadata tracks, an inband event and 'moof' parser (203) can stream the one or more timed metadata tracks to a timed metadata track parser (204). For example, the inband event and 'moof' parser (203) parses a movie fragment box ("moof") and subsequently parses the timed metadata track based on control information from the DASH logic (211).

The timed metadata track parser (204) can extract event messages embedded in the timed metadata track. The extracted event messages can be stored in an event and timed metadata buffer (206). A synchronizer/dispatcher module (208) (e.g., event and timed metadata synchronizer and dispatcher) can dispatch (or send) the subscribed events to the application (212).

MPD events described in the MPD can be parsed by the manifest parser (210) and stored in the event and timed metadata buffer (206). For example, the manifest parser (210) parses each event stream element of the MPD, and parses each event described in each event stream element. For each event signaled in the MPD, event information such as presentation time and event duration can be stored in the event and timed metadata buffer (206) in association with the event.

The inband event and 'moof' parser (203) can parse media segments to extract inband event messages. Any such identified inband events and associated presentation times and durations can be stored in the event and timed metadata buffer (206).

Accordingly, the event and timed metadata buffer (206) can store therein MPD events, inband events, and/or timed metadata events. The event and timed metadata buffer (206) can be a First-In-First-Out (FIFO) buffer, for example. The event and timed metadata buffer (206) can be managed in correspondence with a media buffer (207). For example, as long as a media segment exists in the media buffer (207), any events or timed metadata corresponding to that media segment can be stored in the event and timed metadata buffer (206).

A DASH Access API (202) can manage the fetching and reception of a content stream (or dataflow) including media content and various metadata through an HTTP protocol stack (201). The DASH Access API (202) can separate the received content stream into different dataflows. The dataflow provided to the inband event and 'moot' parser (203) can include media segments, one or more timed metadata tracks, and inband event signaling included in the media segments. In an embodiment, the dataflow provided to the manifest parser (210) can include an MPD.

The DASH Access API (202) can forward the manifest to the manifest parser (210). Beyond describing events, the manifest can also provide information on media segments to the DASH logic (211), which can communicate with the application (212) and the inband event and 'moof' parser (203). The application (212) can be associated with the media content processed by the DASH client. Control/synchronization signals exchanged among the application (212), the DASH logic (211), the manifest parser (210), and the DASH Access API (202) can control the fetching of media segments from the HTTP Stack (201) based on information regarding media segments provided in the manifest.

The inband event and 'moof' parser (203) can parse a media dataflow into media segments including media content, timed metadata in a timed metadata track, and any signaled inband events in the media segments. The media segments including media content can be parsed by a file format parser (205) and stored in the media buffer (207).

The events stored in the event and timed metadata buffer (206) can allow the synchronizer/dispatcher (208) to communicate to the application (212) the available events (or events of interest) related to the application (212) through an event/metadata API. The application (212) can be configured to process the available events (e.g., MPD events, inband events, or timed metadata events) and subscribe to particular events or timed metadata by notifying the synchronizer/dispatcher (208). Any events stored in the event and timed metadata buffer (206) that are not related to the application (212), but are instead related to the DASH client itself can be forwarded by the synchronizer/dispatcher (208) to the DASH logic (211) for further processing.

In response to the application (212) subscribing to particular events, the synchronizer/dispatcher (208) can communicate to the application (212) event instances (or timed metadata samples) corresponding to event schemes to which the application (212) has subscribed. The event instances can be communicated in accordance with a dispatch mode indicated by the subscription request (e.g., for a specific event scheme) or a default dispatch mode. For example, in an on-receive dispatch mode, event instances may be sent to the application (212) upon receipt in the event and timed metadata buffer (206). On the other hand, in an on-start dispatch mode, event instances may be sent to the application (212) at their associated presentation time, for example in synchronization with timing signals from the media decoder (209).

It is noted that, in the DASH client architecture, the thick dataflow lines indicate media dataflow, the narrow dataflow lines indicate even and timed metadata dataflow, and the dash dataflow lines indicates control and synchronization. In addition, the same processing model can be used for CMAF events.

Figure 3:
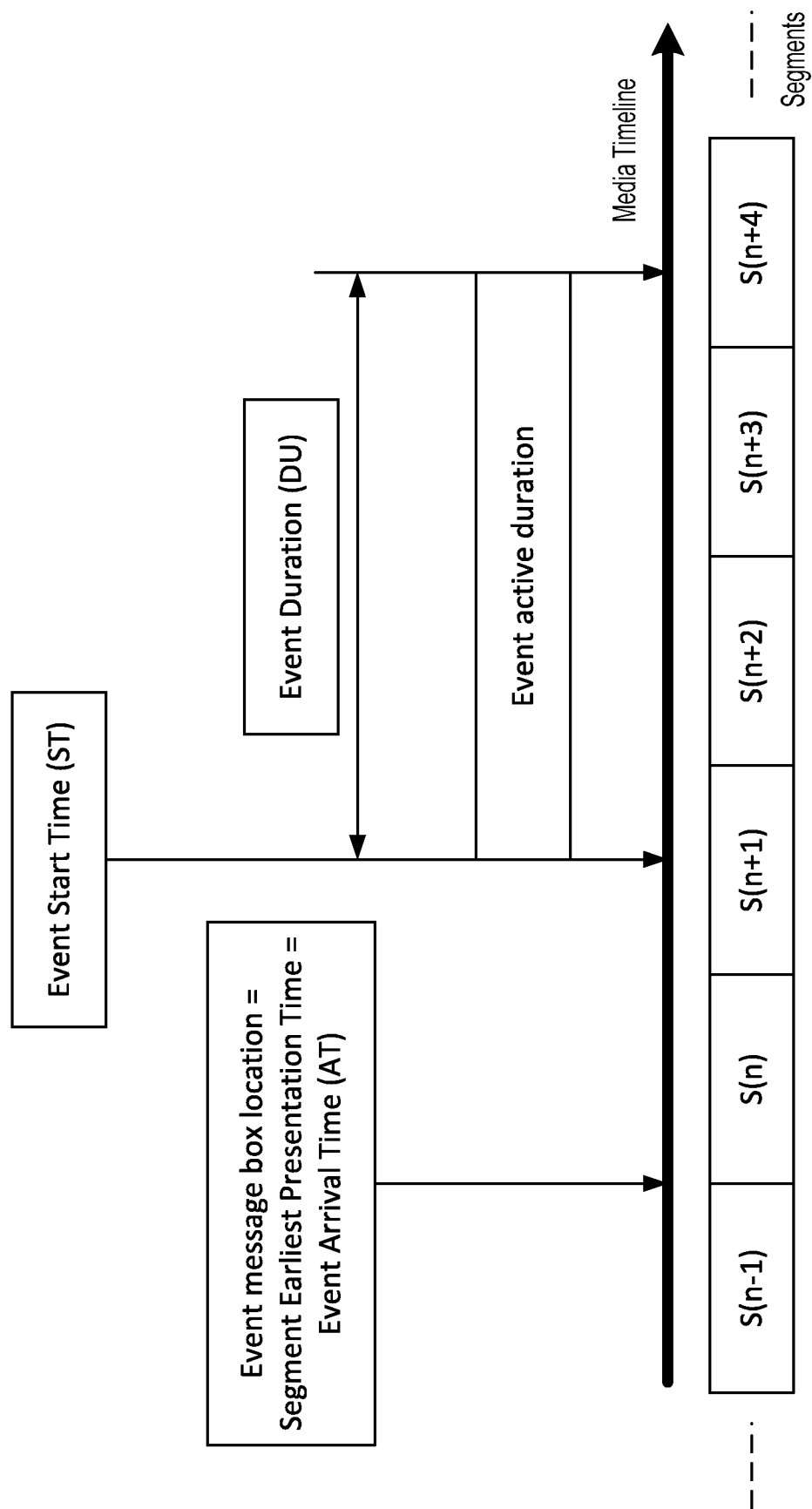
FIG. 3 shows an exemplary inband event timing model according to an embodiment of the disclosure.

FIG. 3 shows an exemplary timing model of an event message box according to an embodiment of the disclosure. In the timing model, each event message box can be described by three timing parameters on the media timeline: (i) event arrival time (AT) which is an earliest presentation time of a segment including the event message box; (ii) event presentation/start time (ST) which is a moment in the media (MPD) timeline that the event becomes active; and (iii) event duration (DU) during which the event is active.

The event message box can be inserted at the beginning of a media segment. Therefore, the earliest presentation time of the media segment carrying the event message box can be considered as a location of the event message box on the media timeline. The DASH client can fetch and parse the media segment before or at the AT of the event message box.

The ST of the event message box can have an offset from the location of the media segment (e.g., DASH segment or CMAF chunk) that carries the event message box in the track. An anchor of the ST can be different depending on a version of the event message box. For an event message box with version 0, the anchor can be the earliest presentation time of the CMAF fragment/DASH segment carrying the event message box. For an event message box with version 1, the anchor can be the earliest presentation time of the CMAF track/DASH period carrying the event message box.

According to ISO/IEC 23000-19, a timescale of the event message box can be equal to a timescale in the MediaHeaderBox of the CMAF track. The event message box can be inserted at the beginning of a CMAF chunk, CMAF fragment or CMAF segment. An anchor of the event message box version 0 in a CMAF fragment is the earliest presentation time of the fragment. In addition, according to ISO/IEC 23009-1, the event message box can be placed before the first 'moof' box of the segment, or can be placed in between any media data box ('mdat') and 'moof' box. In the latter case, an equivalent 'emsg' with the same id value should be present before the first 'moof' box of any segment.

III. Fragmentation/Defragmentation Processes

The fragmentation/defragmentation processes of ISOBMFF may fragment and defragment an ISOBMFF track with an arbitrary size of fragments. In either process, the resulting non-fragmented or fragmented track should be a valid ISOBMFF track. In this case, all event message boxes included in the new track must maintain the correct timing.

According to aspects of the disclosure, the fragmentation/defragmentation processes can be performed on a metadata track in units of metadata samples. Therefore, during the fragmentation/defragmentation processes, a correct timing of a single metadata sample can be maintained. However, in the case of a segment including multiple metadata samples, a correct timing of the segment may not be maintained during the fragmentation/defragmentation processes. In addition, if the segment includes an event message box with version 0 and the correct timing of the segment is not maintained in the fragmentation/defragmentation processes, a correct timing of the event message box may not be maintained since an anchor of the ST of the event message box with version 0 is the earliest presentation time of the segment.

The survivability of CMAF fragments/DASH segments under any arbitrary fragmentation and defragmentation can be analyzed as follows.

If the DASH segment/CMAF fragment includes an event message box with version 0, the fragmentation/defragmentation processes can fail, since the anchor of the event message box is the earliest presentation time of the DASH segment/CMAF fragment and can be lost during the fragmentation/defragmentation processes of the DASH/CMAF media track.

If the DASH segment/CMAF fragment includes an event message box with version 1, the fragmentation/defragmentation processes can pass, since the anchor of the event message box is the earliest presentation time of the DASH/CMAF media track and preserved during the fragmentation/defragmentation processes of the DASH/CMAF media track.

Table 1 summarizes the status of DASH and CMAF tracks for the fragmentation/defragmentation processes.

TABLE 1

| Track | Fragmentation | Defragmentation |
| --- | --- | --- |
| DASH w/emsg V0 | X | X |
| DASH w/emsg V1 | OK | OK |
| CMAF w/emsg V0 | X | X |
| CMAF w/emsg V1 | OK | OK |

Figure 4:
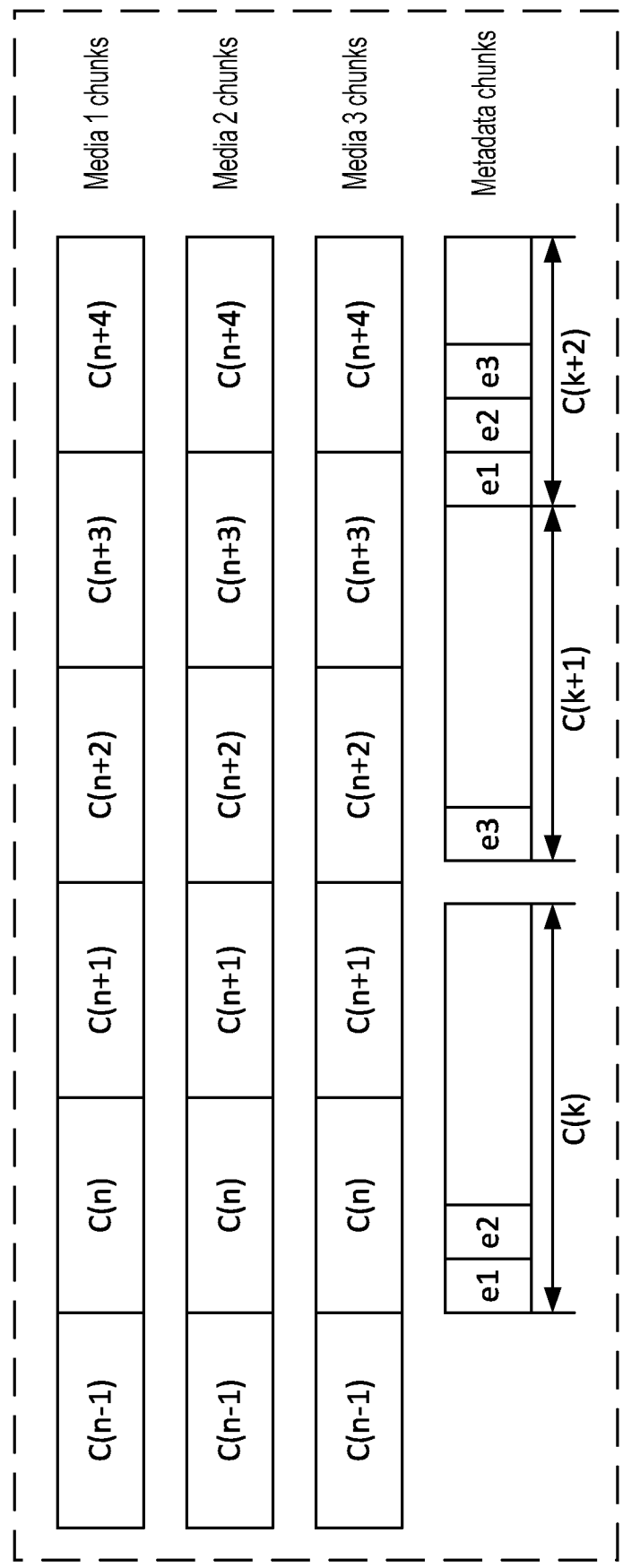
FIG. 4 shows an example of media tracks and a timed metadata track that can be included in a content stream according to an embodiment of the disclosure.

FIG. 4 shows an example of media tracks and a timed metadata track that can be included in a content stream according to an embodiment of the disclosure. The metadata track can include event message boxes. The event message boxes can be used to provide signaling for generic events related to media presentation time. In some embodiments, if a DASH client detects an event message box with a scheme that is not defined in an MPD, the DASH client ignores the event message box.

An event message box can include message scheme identification information (e.g., scheme_id_uri), an optional value for an event contained in the event message box, timing information, and event data. The timing information can indicate a timescale (e.g., in ticks per second) for other time information, such as a media presentation time delta of a media presentation time of the event from a reference presentation time (e.g., beginning of a segment or a metadata sample), a media presentation time of the event, and event duration (e.g., in media presentation time).

The metadata track can carry the event message boxes as part of metadata samples included in the metadata track.

Further, a metadata sample can include one or more event message boxes. Each event message box can belong to an event scheme that is defined by a scheme URI id, and optionally a value, of the respective event message box. Since event instances from multiple schemes can be included in one or more metadata samples, the event schemes need to be identified in the DASH manifest in order for the schemes to be discovered by the DASH client.

DASH includes two elements that can be used to describe event schemes in an MPD. The two elements are an event stream element (e.g., EventStream) for MPD events and an inband event stream element (e.g., InbandEventStream) for inband events. Both event schemes can use the same construct.

IV. Single-Sample Sparse Timed Metadata

According to aspects of the disclosure, a metadata segment/fragment including embedded event message boxes can be a single-sample DASH segment/CMAF fragment or a multi-sample DASH segment/CMAF fragment. The single-sample DASH segment/CMAF fragment can include only one metadata sample and the duration of the metadata sample is equal to the duration of the DASH segment/CMAF fragment. The multi-sample DASH segment/CMAF fragment can include multiple metadata samples.

If the single-sample DASH segment/CMAF fragment includes an event message box with version 0, the fragmentation/defragmentation processes can pass. Since the earliest presentation time of the segment/fragment is the same as the presentation time of the only one metadata sample included in the segment/fragment, the timing of the event message box can be preserved during the fragmentation/defragmentation processes if the anchor of the event message box is considered to be the presentation time of the metadata sample including the event message box.

If the single sample DASH segment/CMAF fragment includes an event message box with version 1, the fragmentation/defragmentation processes can pass since the earliest presentation time of the track is the anchor of the event message box.

If the multi-sample DASH segment/CMAF fragment includes an event message box with version 0, the fragmentation/defragmentation processes can fail since the anchor of the event message box is the earliest presentation time of the segment/fragment and can be lost during the fragmentation/defragmentation processes.

If the multi-sample DASH segment/CMAF fragment includes an event message box with version 1, the fragmentation/defragmentation processes can pass since the earliest presentation time of the track is the anchor of the event message box.

Table 2 summarizes the status of single-sample and multi-sample metadata segment/fragment with embedded event message box(es) for the fragmentation/defragmentation processes.

TABLE 2

| Track | Fragmentation | Defragmentation |
| --- | --- | --- |
| Single-sample per segment w/emsg V0 | OK* | OK* |
| Single-sample per segment w/emsg V1 | OK | OK |
| Multi-sample per segment w/emsg V0 | X | X |
| Multi-sample per segment w/emsg V1 | OK | OK |

*Under the condition that the anchor reference is the presentation time of the sample carrying the event.

According to aspects of the disclosure, the following constraints can be applied on CMAF sparse metadata tracks to satisfy ISOBMFF fragmentation/defragmentation processes: (i) each CMAF fragment/DASH segment includes only one metadata sample (or is limited to one metadata sample), and the duration of the metadata sample is the duration of the fragment/segment; (ii) the earliest presentation time of the CMAF fragment/DASH segment is the presentation time of the metadata sample; (iii) in non-fragmented tracks, each event message box with version 0 can use the presentation time of the metadata sample including the respective event message box as the anchor for a presentation time offset parameter (e.g., presentationtime_delta) of the respective event message box; (iv) in non-fragmented tracks, each event message box with version 1 can use the earliest presentation time of the track as the anchor for a presentation time parameter (e.g., presentation time) of the respective event message box; (v) in all cases (e.g., DASH or CMAF, fragmented or non-fragmented), the time scale of each event message box (e.g., with version 0 or version 1) can be equal to the timescale of the track; and (vi) the end time (e.g., event start time plus event duration) of the event message box does not extend beyond the end (or latest) presentation time of the track, even if the value of the event duration signals that the end time of the event message box extends beyond the end presentation time of the track.

Constraints (i) and (ii) can allow the fragmentation/defragmentation of the tracks without changing the timing of an event message box with version 0 since the presentation time of the metadata sample carrying the event message box would not change during the arbitrary fragmentation/defragmentation processes.

Constraints (iii) and (iv) are constraints for non-fragmented tracks and can allow the relationship between fragmented/segmented single-sample sparse metadata tracks and non-fragmented tracks to be maintained.

Constraint (v) can ensure that the timing of the events lines up with the track sample timings so that a fractional drift does not exist when the file format parser (205) and the media decoder (209) use integer arithmetic.

Constraint (vi) can restrict the event duration to be the maximum track duration and thus can simplify the operation in the file format parser (205), especially since application events must be passed to the application (212) which does not necessarily have the track duration. Therefore, if the duration of each event message box is set to be such that the event message box ends before or at the end of the track, then the file format parser (205) does not need to truncate the event duration if the event duration goes beyond the track duration before passing the event to the application (212).

Some benefits of the single-sample sparse timed metadata track can be listed as follows. The structure of the single-sample sparse timed metadata track is simple, since each fragment/segment includes only one (sync) metadata sample. Each metadata sample can include one or more event message boxes with various schemes/sub-schemes. The fragmented tracks can pass the fragmentation/defragmentation processes if the fragmentation/defragmentation processes hold the single-sample fragment/segment constraint. The constraints for the anchor of the event message box in non-fragmented tracks are simple and easy to maintain. The property of the event message boxes can be maintained to be delivered using a separate track from media tracks and therefore the delivery is not dependent on any specific media tracks.

According to aspects of the disclosure, a sparse timed metadata track can be generated in which each segment/ fragment includes only one metadata sample. A metadata sample can include one or more event message boxes. Each event message box can include a different scheme identifier and a different value for an associated sub-scheme identifier carrying a message data payload. The timescale of the event message box is equal to the timescale of track. The presentation time and duration of a metadata sample is equal to the earliest presentation time and duration of the segment/fragment including the metadata sample. In the case of defragmentation, the anchor for the presentation time (e.g., presentation time) and/or presentation time offset (e.g., presentation_time_delta) of an event message box is the presentation time of the metadata sample including the event message box.

V. Flowchart

Figure 5:
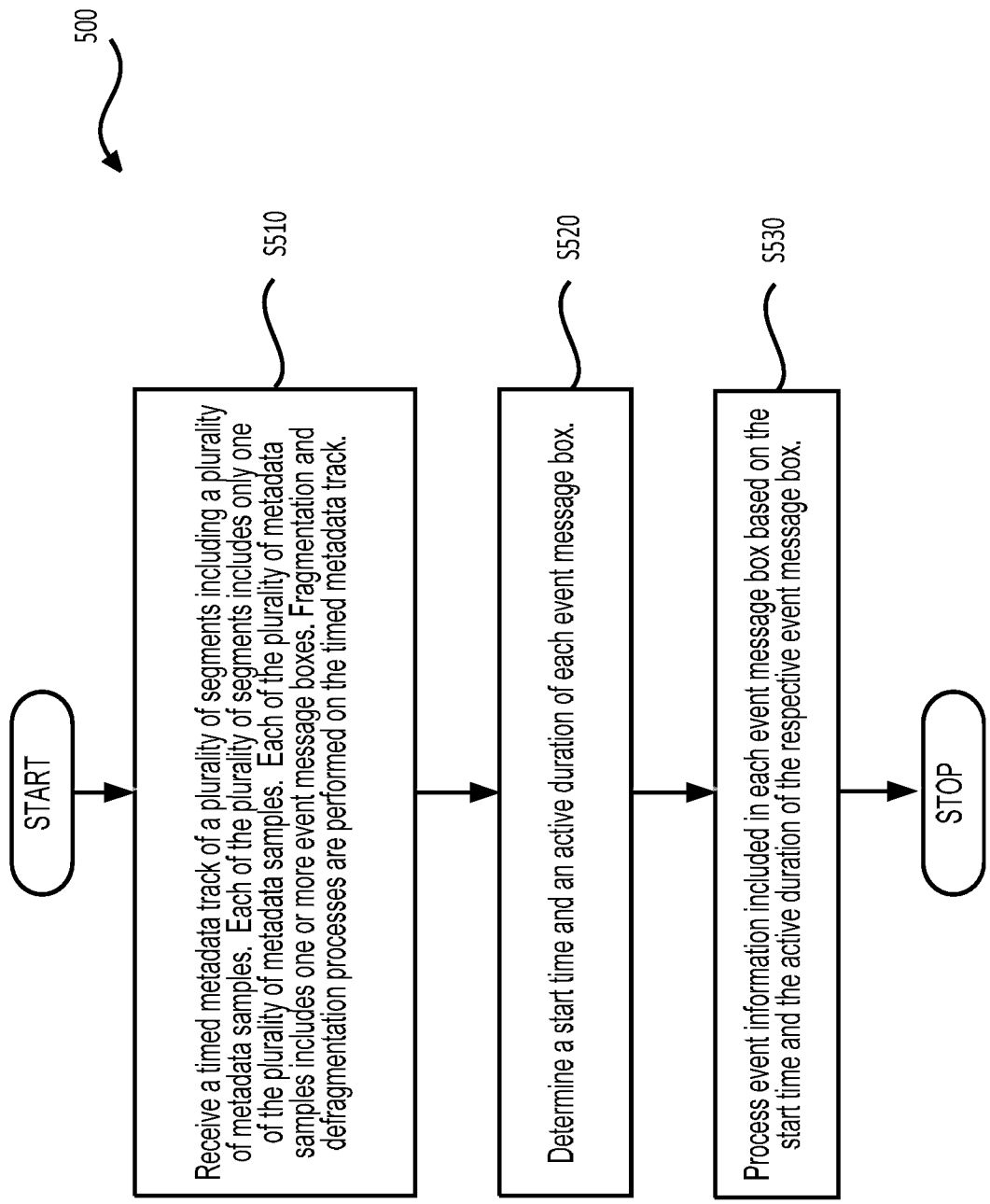
FIG. 5 shows a flow chart outlining a process example in accordance with some embodiments.

FIG. 5 shows a flow chart outlining a process (500) according to an embodiment of the disclosure. In various embodiments, the process (500) is executed by processing circuitry, such as the processing circuitry in the DASH client (102). In some embodiments, the process (500) is implemented in software instructions, thus when the processing circuitry executes the software instructions, the processing circuitry performs the process (500). The process (500) starts at (S510), where the process (500) receives a timed metadata track of a plurality of segments including a plurality of metadata samples. Each of the plurality of segments can include only one of the plurality of metadata samples. Each of the plurality of metadata samples includes one or more event message boxes. Then, the process (500) proceeds to step (S520).

At step (S520), the process (500) determines a start time and an active duration of each event message box. Then, the process (500) proceeds to step (S530).

At step (S530), the process (500) processes event information included in each event message box based on the start time and the active duration of the respective event message box. Then, the process (500) terminates.

In an embodiment, a timescale of each event message box is equal to a timescale of the timed metadata track.

In an embodiment, a presentation time and a duration of each of the plurality of metadata samples are equal to an earliest presentation time and a duration of one of the plurality of segments that includes the respective metadata sample, and fragmentation and defragmentation processes are performed on the timed metadata track.

In an embodiment, the presentation time of each of the plurality of metadata samples is an anchor for one of a presentation time value and a presentation time delta value of an event message box included in the respective metadata sample.

In an embodiment, a sum of the start time and the active duration of each event message box is limited by an end presentation time of the timed metadata track.

In an embodiment, each of the plurality of segments is one of a CMAF fragment and a DASH segment.

In an embodiment, each event message box included in one of the plurality of metadata samples includes a different scheme identifier.

In an embodiment, the fragmentation and defragmentation processes are based on ISO/IEC ISOBMFF fragmentation and defragmentation processes.

VI. Computer System

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
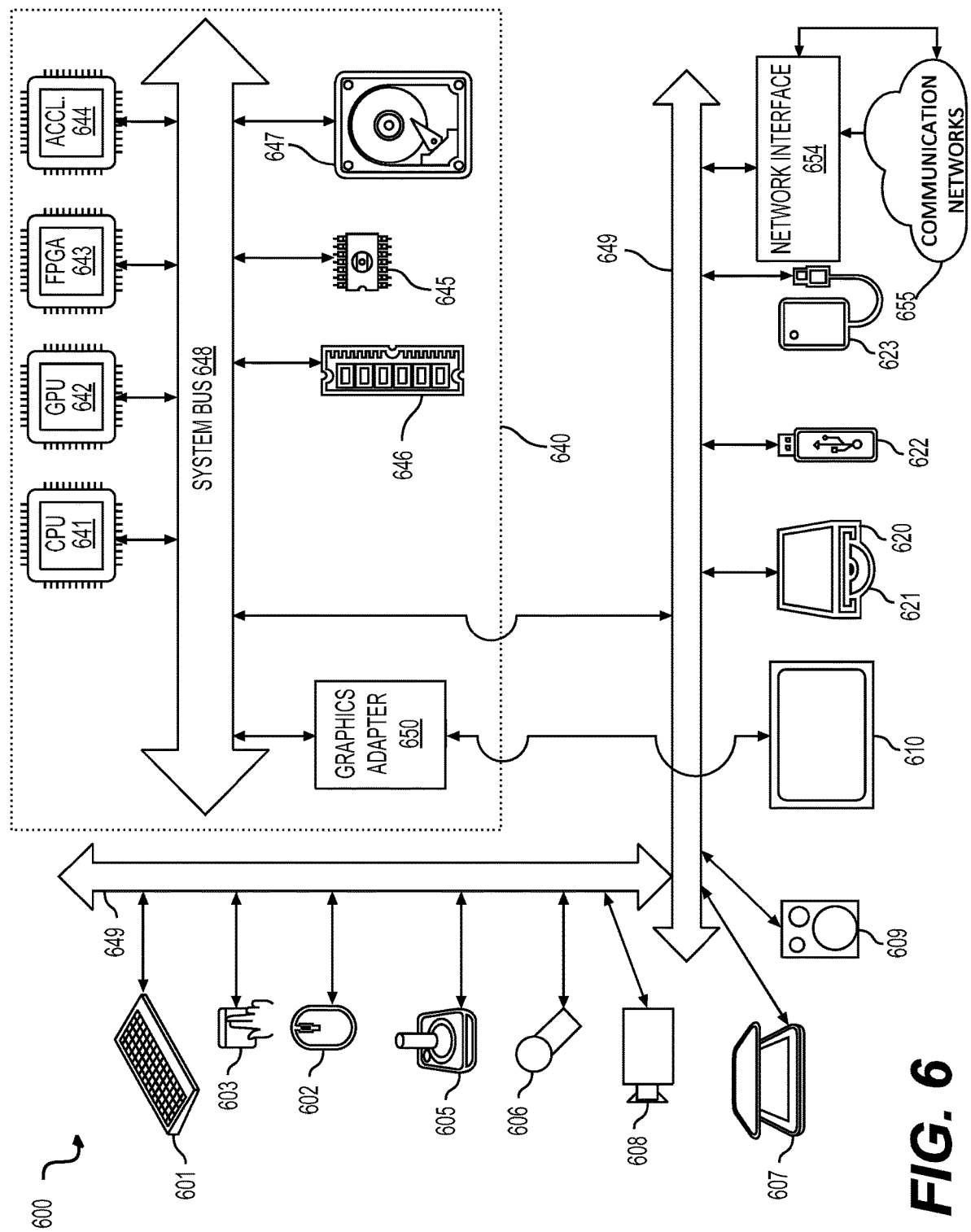
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), and camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (610)) can be connected to a system bus (648) through a graphics adapter (650).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include a network interface (654) to one or more communication networks (655). The one or more communication networks (655) can for example be wireless, wireline, optical. The one or more communication networks (655) can further be local, wide-area, metropolitan, vehicular and industrial, real-time, delay-tolerant, and so on. Examples of the one or more communication networks (655) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through the system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600) and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for receiving media data, the method comprising:
   receiving a timed metadata track of a plurality of segments including a plurality of metadata samples, each of the plurality of segments including only one of the plurality of metadata samples, each of the plurality of metadata samples including one or more event message boxes, and a starting presentation time of each of the plurality of metadata samples being equal to a starting presentation time of a different one of the plurality of segments that includes the respective metadata sample;
   determining a start time and an active duration of each event message box; and
   processing event information included in each event message box based on the start time and the active duration of the respective event message box, wherein fragmentation and defragmentation processes are performed on the timed metadata track in units of the plurality of metadata samples.

2. The method of claim 1, wherein a timescale of each event message box is equal to a timescale of the timed metadata track.

3. The method of claim 1, wherein duration of each of the plurality of metadata samples is equal to a duration of the different one of the plurality of segments that includes the respective metadata sample.

4. The method of claim 3, wherein the starting presentation time of each of the plurality of metadata samples is an anchor for one of a starting presentation time value and a starting presentation time delta value of an event message box included in the respective metadata sample.

5. The method of claim 1, wherein a sum of the start time and the active duration of each event message box is limited by an end presentation time of the timed metadata track.

6. The method of claim 1, wherein each of the plurality of segments is one of a common media application format (CMAF) fragment and a dynamic adaptive streaming over hypertext transfer protocol (DASH) segment.

7. The method of claim 1, wherein each event message box included in one of the plurality of metadata samples includes a different scheme identifier.

8. The method of claim 1, wherein the fragmentation and defragmentation processes are based on the International Organization for Standardization (ISO)/International Electrotechnical Commission (IEC) base media file format (ISOBMFF) fragmentation and defragmentation processes.

9. An apparatus for receiving media data, the apparatus comprising processing circuitry configured to:
receive a timed metadata track of a plurality of segments including a plurality of metadata samples, each of the plurality of segments including only one of the plurality of metadata samples, each of the plurality of metadata samples including one or more event message boxes, and a starting presentation time of each of the plurality of metadata samples being equal to a starting presentation time of a different one of the plurality of segments that includes the respective metadata sample;
determine a start time and an active duration of each event message box; and
process event information included in each event message box based on the start time and the active duration of the respective event message box, wherein
fragmentation and defragmentation processes are performed on the timed metadata track in units of the plurality of metadata samples.

10. The apparatus of claim 9, wherein a timescale of each event message box is equal to a timescale of the timed metadata track.

11. The apparatus of claim 9, wherein a duration of each of the plurality of metadata samples is equal to a duration of the different one of the plurality of segments that includes the respective metadata sample.

12. The apparatus of claim 11, wherein the starting presentation time of each of the plurality of metadata samples is an anchor for one of a starting presentation time value and a starting presentation time delta value of an event message box included in the respective metadata sample.

13. The apparatus of claim 9, wherein a sum of the start time and the active duration of each event message box is limited by an end presentation time of the timed metadata track.

14. The apparatus of claim 9, wherein each of the plurality of segments is one of a common media application format (CMAF) fragment and a dynamic adaptive streaming over hypertext transfer protocol (DASH) segment.

15. The apparatus of claim 9, wherein each event message box included in one of the plurality of metadata samples includes a different scheme identifier.

16. The apparatus of claim 9, wherein the fragmentation and defragmentation processes are based on the International Organization for Standardization (ISO)/International Electrotechnical Commission (IEC) base media file format (ISOBMFF) fragmentation and defragmentation processes.

17. A non-transitory computer-readable storage medium storing instructions which when executed by a computer for receiving media data cause the computer to perform:
receiving a timed metadata track of a plurality of segments including a plurality of metadata samples, each of the plurality of segments including only one of the plurality of metadata samples, each of the plurality of metadata samples including one or more event message boxes, and a starting presentation time of each of the plurality of metadata samples being equal to a starting presentation time of a different one of the plurality of segments that includes the respective metadata sample;
determining a start time and an active duration of each event message box; and
processing event information included in each event message box based on the start time and the active duration of the respective event message box, wherein
fragmentation and defragmentation processes are performed on the timed metadata track in units of the plurality of metadata samples.

18. The non-transitory computer-readable storage medium of claim 17, wherein a timescale of each event message box is equal to a timescale of the timed metadata track.

19. The non-transitory computer-readable storage medium of claim 17, wherein a duration of each of the plurality of metadata samples is equal to a duration of one of the plurality of segments that includes the respective metadata sample.

20. The non-transitory computer-readable storage medium of claim 19, wherein the starting presentation time of each of the plurality of metadata samples is an anchor for one of a starting presentation time value and a starting presentation time delta value of an event message box included in the respective metadata sample.

* * * * *